United States Patent
Padiou et al.

(10) Patent No.: US 10,338,406 B2
(45) Date of Patent: Jul. 2, 2019

(54) METHOD FOR DETERMINING A LENS BLANK INTENDED TO BE USED TO MANUFACTURE AN OPTICAL LENS

(71) Applicant: ESSILOR INTERNATIONAL (COMPAGNIE GENERALE D'OPTIQUE), Charenton-le-Pont (FR)

(72) Inventors: Jean-Marc Padiou, Charenton-le-Pont (FR); Luis Ricardo Castro-Martinez, Charenton-le-Pont (FR); Eric Gacoin, Charenton-le-Pont (FR); Mathieu Meynen, Charenton-le-Pont (FR); Alexandre Gourraud, Charenton-le-Pont (FR); Loic Quere, Charenton-le-Pont (FR); Jerome Moine, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 0 days.

(21) Appl. No.: 15/515,353

(22) PCT Filed: Sep. 25, 2015

(86) PCT No.: PCT/EP2015/072182
§ 371 (c)(1),
(2) Date: Mar. 29, 2017

(87) PCT Pub. No.: WO2016/050655
PCT Pub. Date: Apr. 7, 2016

(65) Prior Publication Data
US 2017/0235157 A1 Aug. 17, 2017

(30) Foreign Application Priority Data
Sep. 30, 2014 (EP) .................... 14306535

(51) Int. Cl.
*G02C 7/02* (2006.01)
*B29D 11/00* (2006.01)
(Continued)

(52) U.S. Cl.
CPC .......... *G02C 7/024* (2013.01); *B29C 33/0038* (2013.01); *B29C 33/68* (2013.01);
(Continued)

(58) Field of Classification Search
CPC .......... G02C 7/024; G02C 7/02; G02C 7/028; G02C 2202/08; G02B 27/0012
(Continued)

(56) References Cited

U.S. PATENT DOCUMENTS 4,540,532 A * 9/1985 Petcen ................ B29C 33/0038
249/112
5,630,746 A 5/1997 Gottschald et al.
(Continued)

FOREIGN PATENT DOCUMENTS

EP 0 152 840 A2 8/1985
EP 0 366 545 A1 5/1990
(Continued)

OTHER PUBLICATIONS

International Search Report, dated Feb. 4, 2016, from corresponding PCT application.

*Primary Examiner* — Jordan M Schwartz
(74) *Attorney, Agent, or Firm* — Young & Thompson

(57) ABSTRACT

Disclosed is a method implemented by computer for determining a lens blank intended to be used for the manufacturing of a finished optical article. The method includes: —a virtual volume data determining step, during which virtual volume data are determined based at least on finished optical article data representative of the volume of the finished optical article and over-thickness data representative of
(Continued)

over-thickness requirements, the virtual volume data are determined so that the virtual volume defined by the virtual volume data includes the volume of the finished optical article volume of the finished optical article and the over-thickness, —a lens blank determining step, during which a lens blank is determined based on the virtual volume data so as to include the virtual volume defined by the virtual volume data.

20 Claims, 3 Drawing Sheets

(51) Int. Cl.
*B29C 33/00* (2006.01)
*B29C 33/68* (2006.01)
*B33Y 80/00* (2015.01)
*G02B 27/00* (2006.01)
*B29L 11/00* (2006.01)

(52) U.S. Cl.
CPC .. *B29D 11/00009* (2013.01); *B29D 11/00557* (2013.01); *B29D 11/00951* (2013.01); *B33Y 80/00* (2014.12); *G02B 27/0012* (2013.01); *G02C 7/02* (2013.01); *G02C 7/028* (2013.01); *B29L 2011/0016* (2013.01); *G02C 2202/08* (2013.01)

(58) Field of Classification Search
USPC .......................... 351/159.73, 159.74, 159.75
See application file for complete search history.

(56) References Cited

U.S. PATENT DOCUMENTS

| | | | |
|---|---|---|---|
| 2006/0189255 A1* | 8/2006 | Akiyama | B24B 9/148 451/5 |
| 2009/0125137 A1* | 5/2009 | Allione | G02B 3/0081 700/97 |
| 2012/0105801 A1* | 5/2012 | Yamakaji | G01M 11/0242 351/159.76 |
| 2012/0127425 A1* | 5/2012 | Goebel Quintana | B29D 11/00432 351/159.61 |
| 2014/0347626 A1* | 11/2014 | Sahler | G02C 7/02 351/159.73 |
| 2016/0114542 A1* | 4/2016 | Quere | B29C 64/106 264/1.1 |
| 2017/0108709 A1* | 4/2017 | Woodland | G02C 7/02 |
| 2017/0153462 A1* | 6/2017 | Steele | G02C 7/024 |

FOREIGN PATENT DOCUMENTS

EP 2 199 021 A1 6/2010
FR 2 771 665 A1 6/1999

* cited by examiner

METHOD FOR DETERMINING A LENS BLANK INTENDED TO BE USED TO MANUFACTURE AN OPTICAL LENS

The invention relates to a method implemented by computer means for determining a lens blank intended to be used for manufacturing a finished optical article. The invention also relates to a method for manufacturing a finished optical article and to optical article supply system.

BACKGROUND OF THE INVENTION

The discussion of the background of the invention herein is included to explain the context of the invention. This is not to be taken as an admission that any of the material referred to was published, known or part of the common general knowledge at the priority date of any of the claims.

An optical lens is generally manufactured in accordance with wearer specifications. In the case, for example, of an ophthalmic lens for the correction or improvement of eyesight, the ophthalmic lens is manufactured according to a wearer prescription corresponding to the visual requirements of that wearer. In addition, the shape and size of the spectacle frame supporting the ophthalmic lens is taken into account. At least one of the surfaces of the ophthalmic lens is processed to provide an ophthalmic lens according to the wearer prescription. The contour of the ophthalmic lens is edged according to the shape of the spectacle frame on which the ophthalmic lens is to be mounted.

An optical lens is generally manufactured from an optical lens blank such as a semi-finished lens blank. A semi-finished lens blank generally has two opposite surfaces at least one of which is unfinished.

The unfinished surface of the lens blank is machined according to the wearer's prescription to provide the required surface of the optical lens. An optical lens having finished back and front surfaces is often referred to as an uncut optical lens. The uncut optical lens is edged according to a shape of a spectacle frame of the optical lens in order to obtain an edged or cut optical lens.

According to further manufacturing processes an optical lens may be obtained by machining both surfaces of an optical lens blank.

With the increasing trend to larger and larger spectacle frames, for example wrap or shield style spectacle frames, the problem of producing optical lens from optical lens blank is more and more complex.

For example as illustrated on FIG. 1, in the case where the frame on which the optical lens 10 is to be mounted is shaped such that the nasal (d2) and temporal (d1) distances, respectively defining the distance between the optical reference point OP and the nasal and temporal edges, are dissymmetric, a lens blank having a significantly larger diameter is required in order to be of sufficient size to enable an optical lens of the required size to be obtained.

This leads to wastage of the optical material of the optical lens blank.

Therefore, it appears that there is a need to for a method for determining the most appropriate lens blank to be used for manufacturing a given finished optical article, such as a optical lens.

SUMMARY OF THE INVENTION

To this end, the invention proposes a method, for example implemented by computer means, for determining a lens blank intended to be used for the manufacturing of a finished optical article. The method of the invention comprises:
  a virtual volume data determining step, during which virtual volume data are determined based at least on finished optical article data representative of the volume of the finished optical article and over-thickness data representative of over-thickness requirements, the virtual volume data are determined so that the virtual volume defined by the virtual volume data includes the volume of the finished optical article volume of the finished optical article and the over-thickness,
  a lens blank determining step, during which a lens blank is determined based on said virtual volume data so as to include the virtual volume defined by the virtual volume data.

Advantageously, the method according to the invention allows providing a lens blank from which the optical lens may be manufactured by machining both of the opposite surfaces based on the over-thickness data.

According to further embodiments which can be considered alone or in combination:
  the over-thickness data are determined based on manufacturing data relating to the manufacturing process to be used for at least part of the manufacturing of the finished optical article; and/or
  the method further comprises a virtual volume orientation step, during which an information indicative of the orientation of the virtual volume is generated based on at least one of: the manufacturing data and/or finished optical article data; and/or
  during the lens blank determining step, the lens blank is determined based also on said information indicative of the orientation of said virtual volume; and/or
  during the lens blank determining step, the lens blank is determined by selecting the most suitable lens blank among a list of lens blanks; and/or
  the list of lens blanks comprises lens blank differing in there diameter and/or thickness; and/or
  the virtual volume comprises a first surface, a second surface opposed to the first surface and a first peripheral edge surface linking the first surface to the second surface,
  the finished optical article comprises a third surface, a fourth surface opposed to the third surface and a second peripheral edge surface linking the third surface to the fourth surface,
  the over-thickness data comprises a machining over-thickness value corresponding to the minimum distance between each point of a first set of surfaces consisting in the first and second surfaces of the virtual volume and each point of a second set of surfaces consisting in the third and the fourth surfaces of the finished optical article; and/or
  the machining over-thickness value is greater than or equal to 0.5 mm; and/or
  the virtual volume comprises a first surface, a second surface opposed to the first surface and a first peripheral edge surface linking the first surface to the second surface,
  the finished optical article comprises a third surface, a fourth surface opposed to the third surface and a second peripheral edge surface linking the third surface to the fourth surface,
  the over-thickness data comprises a rigidity over-thickness value corresponding to the minimum distance between each point of the first of the third and fourth surfaces of the finished optical article to be manufactured and the surface of the virtual volume directly opposite to the second of the third and fourth surfaces of the finished optical article to be manufactured; and/or the rigidity over-thickness value is greater than or equal to 4 mm; and/or the virtual volume comprises a first surface, a second surface opposed to the first surface and a first peripheral edge surface linking the first surface to the second surface, the finished optical article comprises a third surface, a fourth surface opposed to the third surface and a second peripheral edge surface linking the third surface to the fourth surface, the over-thickness data comprises a outline over-thickness value corresponding to the minimum distance between the inscribed circle of first peripheral edge surface of the virtual volume and the circumscribed circle of the second peripheral edge surface of the finished optical article; and/or the outline over-thickness value is greater than or equal to 2 mm; and/or the machining over-thickness value and/or rigidity over-thickness value and/or the outline over-thickness value are set according to the material of the optical element and/or manufacturing process; and/or the $3^{rd}$ face comprises a first referential and the relative position of first referential regarding the turning axis when machining the $3^{rd}$ face is taken into account; and/or the finished optical article is an ophthalmic lens and/or a spectacle lens.

The invention further relates to a method for manufacturing a finished optical article comprising:

a lens blank determining step according to the invention, a manufacturing step during which the finished optical article is manufactured from the determined lens blank.

According to further embodiments which can be considered alone or in combination:

the method further comprises a lens blank providing step during which the lens blank determined is provided, the lens blank providing step comprising cutting a block of optical material so as to obtain the determined lens blank; and/or the block of optical material is one of: a bar or a plate; and/or the method further comprises a lens blank manufacturing step, during which the determined lens blank is manufactured; and/or during the lens blank manufacturing step, information indicative of the determined lens blank are sent to a manufacturing unit; and/or the method further comprises a lens blank forming step during which the lens blank determined is formed, the lens blank forming step comprising conforming a conformable envelope comprising an optical material so as to obtain the determined lens blank; and/or the optical material is one of: a polymerizable composition or a thermo-plastic material; and/or during the lens blank forming step, conforming the conformable envelope comprises molding the conformable envelope so as to obtain the determined lens blank.

The invention also relates to an optical article manufactured from a lens blank determined according to the method of the invention.

The invention further relates to an optical article supply system for providing an optical article comprising:

first processing means suitable for determining virtual volume data of a virtual volume based at least on optical article data wherein said first processing means are located on an optical article determining side and comprises first determining means to determine virtual volume data of a virtual volume based at least on optical article data, first output means to output virtual volume data of a virtual volume and the optical article data, second processing means suitable for determining lens blank data intended to be used for the manufacturing of the optical article based on at least the virtual volume data of the virtual volume wherein the said second processing means are located either on the optical article determining side or on an optical article manufacturing side and wherein the second processing means comprise second determining means to determine lens blank data and second output means to output said lens blank data, third processing means suitable for providing the optical article based at least on the lens blank data, the third processing means being located on the optical article manufacturing side, the third processing means comprise providing means to provide a lens blank suitable with the lens blank data and manufacturing means to manufacture the optical article from said lens blank according to the optical article data, the virtual volume data of the virtual volume.

According to a further aspect, the invention relates to a computer program product comprising one or more stored sequences of instructions that are accessible to a processor and which, when executed by the processor, causes the processor to carry out the steps of the method according to the invention.

The invention further relates to a computer readable medium carrying one or more sequences of instructions of the computer program product according to the invention.

Furthermore, the invention relates to a program which makes a computer execute the method of the invention.

The invention also relates to a computer-readable storage medium having a program recorded thereon; where the program makes the computer execute the method of the invention.

The invention further relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or a Field Programmable Gate Array ("FPGA") or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Other features and advantages of the present invention will become apparent from the following description of non-limitative embodiments, with reference to the attached drawing in which.

DETAILED DESCRIPTION OF THE PREFERRED EMBODIMENTS

The present invention relates to a method, for example implemented by computer means, for determining a lens blank intended to be used for the manufacturing of a finished optical article.

The lens blank is block of material, such as transparent plastic or glass, that is to be machined so as to obtain a finished optical article.

Figure 2:
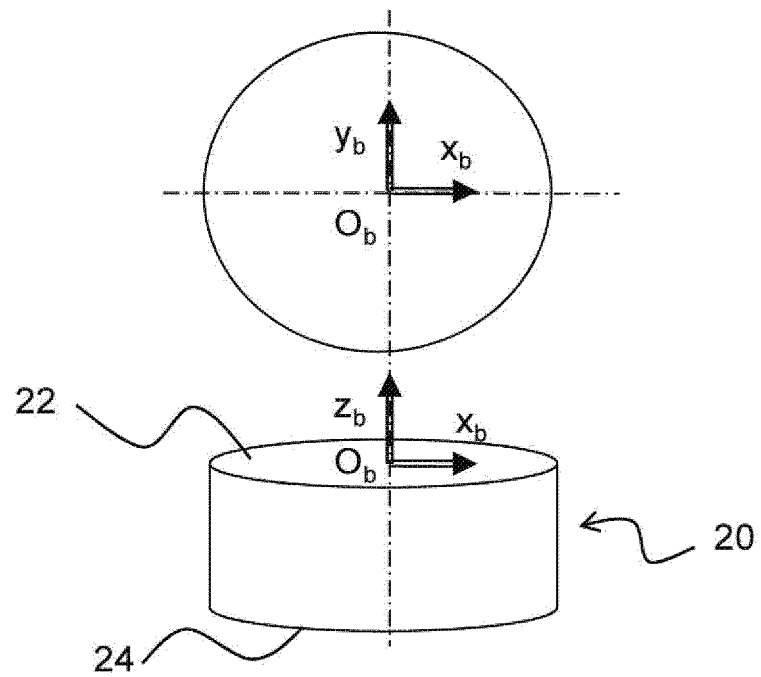
FIG. 2 illustrates a reference frame of an lens blank.

An example of lens blank is represented on FIG. 2. As represented on FIG. 2, the lens blank 20 has a front surface 22 and a rear surface 24 opposed to the front surface 22. The lens blank further comprises a peripheral edge surface linking the front and rear surfaces.

The lens blank may comprise a reference frame defined by an orthonormal basis $R_b$ having a center point $O_b$ and defined by three vectors $(x_b, y_b, z_b)$. Typically, the center point $O_b$ is on the front face 22 of the lens blank at the geometric center of the contour of the front face 22. The vector $z_b$ is defined as perpendicular to the surface of the front face at the center point $O_b$.

Typically, the front and rear surfaces are spherical whose apex is on the axis $(O_b, z_b)$. This facilitates obtaining the lens blank by molding.

The front and rear faces may also be oriented planes $(x_b, y_b)$. This is the case of a lens blank obtained by cutting a block of optical material, such as a plate or a bar.

The peripheral edge surface may be a cylindrical sheet whose generatrix can be conventionally oriented along the axis $(O_b, z_b)$ whose directrix curve and a closed curve is described in the plane $(O_b, x_b, y_b)$. Generally, the peripheral edge surface is a cylinder of revolution.

However, the peripheral edge surface may take more complex forms to meet the needs of positioning or holding the lens blank during machining operations.

For example, the peripheral edge surface may have rectangular contour. In this case, the crude is a parallelepiped.

Typically, the front and rear surfaces of the lens blank are machined so as to obtain a finished optical article.

In the sense of the invention, an optical article refers to any type of known article which has optical properties, such as an optical lens or a spectacle lens.

The term "optical lens" is to be understood to mean any type of known lens intended to be supported by a wearer's face. The term can refer to ophthalmic lenses such as non-corrective lenses, semi-finished lens blanks and corrective lenses, such as progressive addition lenses, unifocal or multifocal lenses. The term can also refer to said ophthalmic lenses which could present at least one added value such as, for example, tint, polarization filtering, electrochromism, antireflective properties, anti-scratch properties or comprise a photochromic unit or a light guide unit.

The term "spectacle lens" refers to an optical lens edged so as to be fitted in a spectacle frame.

Figure 3:
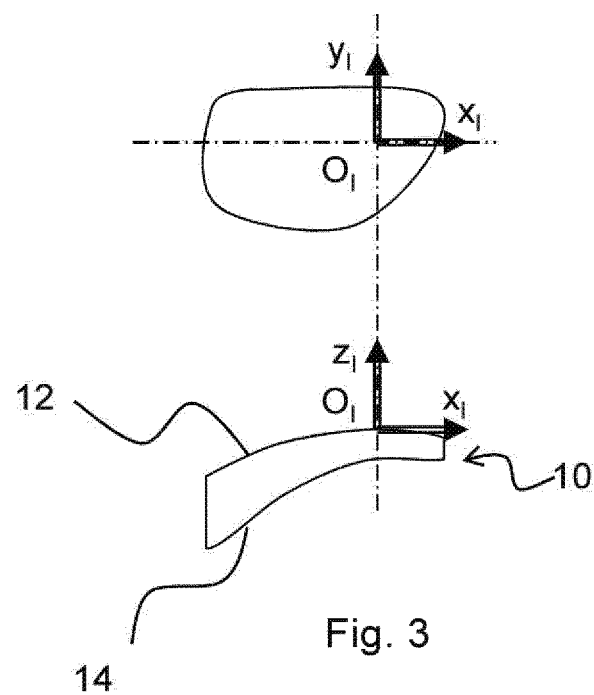
FIG. 3 illustrates a reference frame of a finished optical article.

As represented on FIG. 3, an optical lens comprises a front surface 12 opposed to a rear surface 14, the front and rear surfaces are linked by a peripheral surface 16.

As for the lens blank, the optical lens comprises a reference frame that may be defined on the front surface 12 by an orthonormal basis $R_1$ having a center point $O_1$ and defined by three vectors $(x_1, y_1, z_1)$.

Typically, the center point $O_1$ of the orthonormal basis may be placed at an optical reference point of one of the surfaces of the optical lens, for example on the front surface of the optical lens.

The optical reference point, often referred to as the optical centre, is defined from the point of an intersection of the primary gaze position, coincident with a pupil position of a wearer, and the front surface of the optical lens when mounted on a frame worn by the wearer.

For example, the position of the lens with relation to the eye of the wearer, may be defined with the fitting cross intersecting the primary viewing direction, a distance between the center of rotation of the eye and the first major surface of the lens of 25.5 mm, a pantoscopic angle of 8° and a wrap angle of 0°.

In the case where the optical lens includes a prism, the optical reference point defines the point on the front surface of the optical lens at which the prismatic effect of the finished optical lens is determined. Such a reference point is often referred to as the prism reference point (PRP).

The "optical reference point" is located at the same position as the fitting cross when the optical lens is a unifocal lens.

The "optical reference point" is determined from the position of the fitting cross, for example the optical reference point is located 4 mm below the fitting cross.

The vector $z_1$ is defined as perpendicular to the surface of the front face at the center point $O_1$.

The rear surface may also comprise an orthonormal basis generally having the same vector $z_1$ as the front surface and being tangent to the rear surface.

The peripheral edge surface may be a cylindrical sheet whose generatrix can be conventionally oriented along the axis $(O_1, z_1)$ whose directrix curve and a closed curve is described in the plane $(O_1, x_1, y_1)$. Generally, the peripheral edge surface is a cylinder of revolution.

Alternatively the peripheral edge surface may correspond to the contour of the spectacle frame in which the optical lens is to be mounted.

The lens blank to be determined according to the invention is intended to be used for the manufacturing of a finished optical article. The manufacturing requires the use of a machining tool that comprises a frame of reference, typically defined by a orthonormal basis $R_m$ having a center point $O_m$ and defined by three vectors (xm, ym, zm).

The plan $(O_m, x_m, y_m)$ describes the reference plane used as reference when blocking the lens blank prior to the machining process. Generally, it is desirable that the lens blank is positioned in a balanced manner concerning the centering and the tilting.

With most of the machining tools, the machining is obtained by rotating the lens blank about the axis $(O_m, z_m)$. In this case, the axis $(O_b, z_b)$ of the reference frame of the surface to be machined is aligned with the axis $(O_m, z_m)$. The inclination of the axis $(O_b, z_b)$ relative to the axis $(O_m, z_m)$ creates what is called a machining prism. Similarly, the offset of the point $O_b$ in the plane $(x_m, y_m)$ creates a machining shift.

Figure 1:
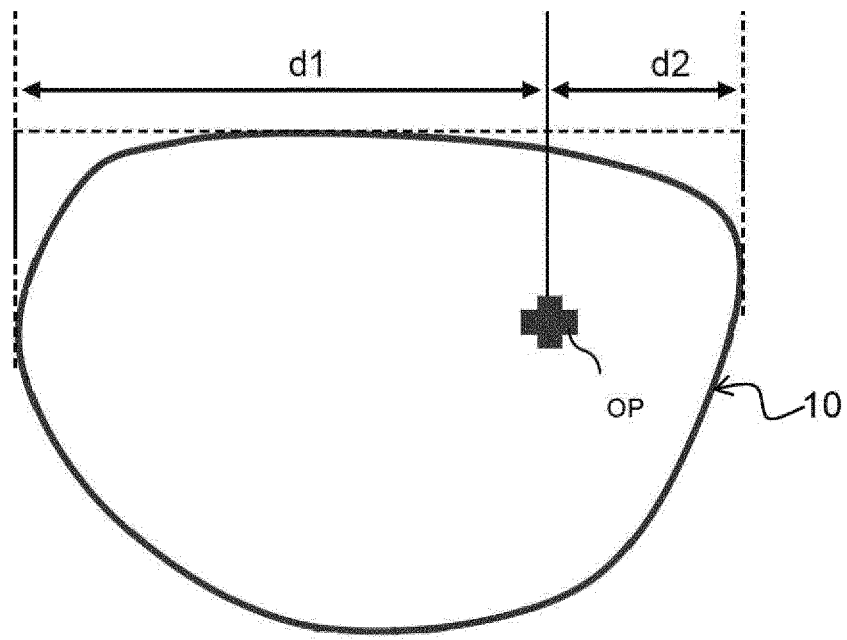
FIG. 1 is a schematic planar view of an edged optical lens.
Figure 4:
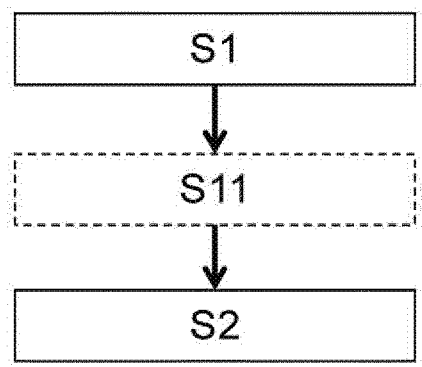
FIG. 4 is a flowchart of different steps of a method of determining a lens blank according to the invention.

As represented on FIG. 4, the method according to the invention comprises:

a virtual volume data determining step S1, and
a lens blank determining step S2.

During the virtual volume data determining step S1, virtual volume data are determined based at least on finished optical article data representative of the volume of the finished optical article and over-thickness data representative of over-thickness requirements.

Figure 5:
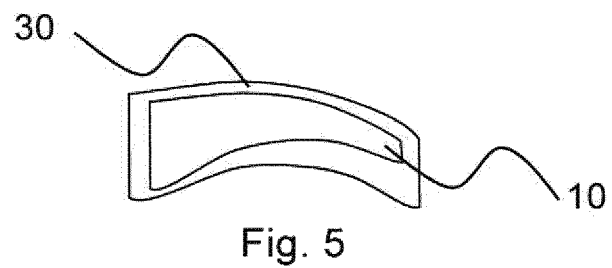
FIG. 5 represents the position of a finished optical article in the virtual volume.

As represented on FIG. 5, the virtual volume data are determined so that the virtual volume 30 defined by the virtual volume data includes the volume of the finished optical article 10 and the over-thickness.

According to an embodiment of the invention, the over-thickness data are determined based on manufacturing data relating to the manufacturing process to be used for at least part of the manufacturing, for example the surfacing, of the finished optical lens.

Typically, the manufacturing data may comprise the machining prism and/or the machining shift. The manufacturing data may also include data relating to the behavior of the material of the lens blank such as stiffness and the contour of the final optical article.

The lens blank to be used for the manufacturing of the finished optical article, is determined during the lens blank determining step based on the virtual volume data so as to include the virtual volume defined by the virtual volume data. In other words, the lens blank is determined, calculated or selected in a list of lens blanks, so that the lens blank is totally comprised in the virtual volume.

According to different embodiments of the invention, the lens blank may be determined by calculation and/or by selecting a lens blank among a list of existing lens blanks.

Typically, the list of lens blanks comprises lens blanks differing in there diameters and/or thickness.

According to an embodiment illustrated on FIG. 5, the virtual volume comprises a first surface, a second surface opposed to the first surface and a first peripheral edge surface linking the first surface to the second surface. The finished optical article comprises a third surface, a fourth surface opposed to the third surface and a second peripheral edge surface linking the third surface to the fourth surface.

The over-thickness data comprises a machining over-thickness value corresponding to the minimum distance between each point of a first set of surfaces consisting in the first and second surfaces of the virtual volume and each point of a second set of surfaces consisting in the third and the fourth surfaces of the finished optical article.

To obtain a uniform surfacing one must guarantee a sufficient thickness of material to remove over the entire useful area of the treated surface.

For this it is necessary to determine a minimum distance between each point of the surface of the finished optical article and the corresponding surface of the optical lens blank.

Such requirements need to be specified for both surfaces of the optical lens.

Elements to consider when determining such minimum distance are:

the "minimum chips" (the minimum amount of material to ensure not to change cutting mode when machining)
the tolerances of fabrication of the lens blank,
the uncertainties of position when positioning the lens blank on the machining device, and
the uncertainties when adjusting the machine tool, The inventors have observed that a machining over-thickness value greater than or equal to 0.5 mm provides good machining results.

Furthermore, during the manufacture of the finished optical article usually the manufacturing of both surfaces are done one after the other.

After having manufactured the first surface, the opposite face of the obtained semi-finished optical lens has to be manufactured. Therefore the semi-finished optical lens has to be rigid enough to withstand the blocking step (locking and clamping clip) without irreversible deformation.

The temptation to avoid the risks associated with the machining over-thickness is to have the optical lens at even distance between both faces of the lens blank. However, the inventors have observed that this may lead to a semi-finished too thin thus lacking rigidity.

Therefore, according to an embodiment of the invention, the over-thickness data comprises a rigidity over-thickness value corresponding to the minimum distance between each point of the first of the third and fourth surfaces of the finished optical article to be manufactured and the surface of the virtual volume directly opposite to the second of the third and fourth surfaces of the finished optical article to be manufactured.

The inventors have observed that having a rigidity over-thickness value greater than or equal to 4 mm provides good results.

According to an embodiment of the invention, the method may further comprise a positioning step during which the optical lens is virtually positioned in the virtual volume according to optimizing parameters. The positioning step allows determining an optimized position between one of the two extreme positions in which the over-thickness requirements are fulfilled.

Typically, the position of the center point $O_1$ of the orthonormal basis $R_1$ of the optical lens along the axis (Ob, zb) may be optimized based on at least one of the following criteria:
- reducing the overall machining time of both surfaces,
- reducing the overall stress in the lens blank during the machining steps,
- balancing the machining forces to be applied when machining the first and second surfaces.

During the positioning step the optical lens is positioned in the virtual volume considering the over-thickness requirements.

Furthermore, when manufacturing sequentially the faces of the lens blank, an outline over thickness may be required.

Thus, according to an embodiment of the invention, the over-thickness data comprises an outline over-thickness value corresponding to the minimum distance between the inscribed circle of first peripheral edge surface of the virtual volume and the circumscribed circle of the second peripheral edge surface of the finished optical article.

The inventors have observed that an outline over-thickness greater than or equal to 2 mm provides good results.

For example, the center of the circumscribed circle of the edge of the finished optical article may correspond to the center of the inscribed circle of the edge of the lens blank.

Advantageously, such outline over-thickness allows overcoming the uncertainties concerning the manufacturing of the lens blank and the positioning of the lens blank during the manufacturing process.

Furthermore, having such outline over-thickness allows guarantying the possibility to use the edge of the lens blank for mechanical positioning reference to be able to position each of the faces of the optical lens relative to the other during the machining process.

Typically, the machining over-thickness value and/or rigidity over-thickness value and/or the outline over-thickness value may be set according to the material of the optical element and/or manufacturing process.

According to an embodiment of the invention, the method further comprises a virtual volume orientation step S11. Information indicative of the orientation of the virtual volume is generated based on at least one of: the manufacturing data and/or finished optical article data during the virtual volume orientation step. The orientation of the virtual volume is considered relative to the orthonormal basis of the lens blank or the frame of reference of the machining tool to be used for machining the finished optical article.

According to an embodiment, during the lens blank determining step, the lens blank is determined based also on said information indicative of the orientation of said virtual volume.

Figure 6:
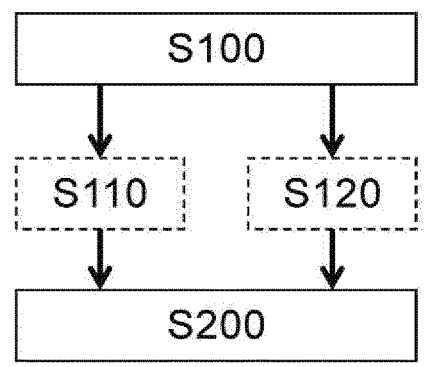
FIG. 6 is a flowchart of different steps of a method of manufacturing an optical article according to the invention.

As represented on FIG. 6, the invention further relates to a method for manufacturing a finished optical article, such as an optical lens, the method comprises at least:
- a lens blank determining step S100, and
- a manufacturing step S200, During the lens blank determining step, the lens blank is determined according to the method of the invention described previously.

The finished optical article, for example the optical lens, is manufactured from the determined lens blank during the manufacturing step. Typically the features of the manufacturing process, such as the machining tools, are used during the lens blank determining step.

As illustrated on FIG. 6, the method according to the invention may further comprise a lens blank providing step S110 during which the determined lens blank is provided.

The lens blank may be provided from a selection of a lens blank in a set of existing lens blanks Typically, the lens manufacturer may have a set of lens blanks that he may use to manufacture a given optical lens. The features, geometry, dimensions, material etc. of each lens blank are considered during the lens blank determining step and the most appropriate lens blank in the set of lens blanks is selected. Features of the manufacturing process to be used when manufacturing the optical lens may also be considered when determining the most appropriate lens blank.

Further to the determination of the most appropriate lens blank, the lens manufacturer may pick the lens blank and manufacture the optical lens, for example using the identified manufacturing process.

The lens blank providing step of the invention may further comprise cutting a block of optical material so as to obtain the determined lens blank. The block of optical material may be one of: a bar or a plate.

For example, a bar of material, having sufficient diameter size so as to include the virtual volume, may be cut so that the thickness is adjusted to the minimum thickness including the virtual volume. Bars differing in diameter size can also be used, and the bar having a diameter just greater or equal to the diameter of the virtual volume may be selected. As another example, it is possible to use different plates having different thickness and select the plate having the thickness just greater or equal to the virtual volume thickness. Then, the selected plate is cut so as to include the virtual volume.

According to a further embodiment of the invention, the lens blank providing step of the invention may further comprise manufacturing the lens blank, for example by machining a standard lens blank. The manufacturing of the lens blank may comprise additive manufacturing.

The method according to the invention may further comprise lens blank information providing step during which information concerning the determined lens blank are sent to the manufacturing unit and may be taken into account to adjust the manufacturing parameters.

The method according to the invention may further comprise a lens blank forming step S120 during which the lens blank determined is formed. In particular, the lens blank forming step may comprise conforming a conformable envelope comprising an optical material so as to obtain the determined lens blank.

The conformable envelope may be flexible or partially rigid, and hermetic. The conformable envelope is intended to be filled with an optical material, preferably transparent, and to be conformed to the geometry of the determined lens blank. A conformable envelope of an optical material may correspond to a plurality of lens blank. More precisely, the conformable envelope comprises a volume of optical material which correspond to a plurality of lens blank. This allows reducing the number of lens blank to be stored.

In general, the conformable envelope comprises the volume of optical material necessary to form the determined lens blank and the volume of optical material corresponding to the over-thickness requirements, as determined during the virtual volume data determining step S1. The conformable envelope may also comprise a volume of optical material corresponding to manipulating elements for further operations, such as a volume of optical material for a strip on a side of the lens blank allowing to hold the lens blank.

The optical material may be a polymerizable composition. A polymerizable composition may comprise one or more types of monomers. The polymerization of the polymerizable composition of the conformable envelope allows obtaining a rigid lens blank. The conformable envelope may protect and package the lens blank formed after the polymerization. The conformable envelope may be transparent for ultra-violet (UV) rays, and thus allow a UV polymerization. The polymerization may be carried out in a water sterilizer, or in an air sterilizer.

The optical material may be a thermo-plastic material. The thermo-plastic material may be a in the form of granules, or in the form of a block. The thermo-plastic material becomes liquid or viscous with the increasing of the temperature, and allows the conformable envelope of thermo-plastic material to be molded in order to form a lens blank.

The volume of optical material of the conformable envelope may comprise a volume corresponding to the removal or increase of volume of optical material due to the polymerization. For example, the volume of optical material of the conformable envelope may comprise a volume of optical material relative to the degassing waste due to the polymerization. As another example, the volume of optical material of the conformable envelope may comprise a volume of optical material corresponding to the loss of optical material during the process of polymerization, such as the loss of optical material in the sprue and/or the loss of optical material against the wall of the envelope, may be considered.

The conformable envelope may comprise a valve for evacuating the degassing waste during the polymerization.

The conformable envelope allows reducing the waste of optical material, by adapting the form of the lens blank to a minimum volume of optical material necessary to form the lens blank determined.

The conformable envelope may be stored filled with the optical material, partially filled with the optical material, or may be stored empty. For example, the conformable envelope may be filled with one or more types of monomers just before conforming the lens blank. The conformable envelope may be filled with optical material comprising different types of monomers, the different types of monomers being mixed before or during filling the conformable envelope.

In particular, storing conformable envelopes may allow reducing the storage volume of lens blank, by storing empty comfortable envelopes or by storing comfortable envelopes adapted to be used for a plurality of lens blanks During the lens blank forming step, conforming the conformable envelope may comprise molding the conformable envelope so as to obtain the determined lens blank.

The conformable envelope may be molded with at least one rigid mold. The rigid mold may conform the thickness of the lens blank to be formed from the conformable envelope. Advantageously, the surface mold may be unpolished in order to reduce the costs production.

In addition, the conformable envelope may be molded with at least one segment, which conforms the geometry of the lens blank to be formed.

Advantageously, the mold may be heated. For example, the optical material may be polymerized or the thermoplastic may be conformed with at least one heating mold, for example with induction heating or with diffusion heating.

The conformable envelope may also be molded with at least one flexible mold. The flexible molds may be conformed with a system of vacuum and pressure in order to conform the geometry, for example the thickness and/or the shape, of the lens blank to be formed. In particular, the shape of the flexible molds may be adapted to conform the conformable envelope. The flexible mold may be conformed with a system of pistons.

Figure 7:
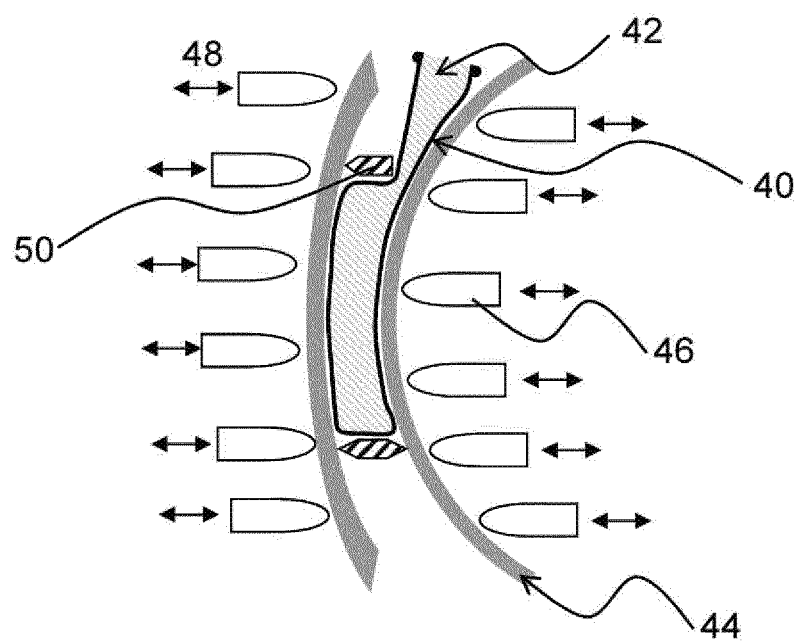
FIG. 7 represents the conforming of a conformable envelope of optical material according to an embodiment of the invention.

For example, FIG. 7 represents a conformable envelope 40 of optical material 42 conformed between two flexible molds 44 conformed with a system of pistons 46. The conformable envelope 40 may be inserted between the flexible molds 44, and between segments 50. The system of pistons 46 allows conforming the flexible molds 44 so as to conform the thickness and/or the shape of the lens blank to be formed from the conformable envelope 40. For example, the arrows 48 represent the seesaw motion of each piston 46. The segments 50 allow conforming the geometry of the lens blank to be formed.

The conformable envelope may also be conformed directly with a system of pistons, so as to conform the geometry, for example the thickness and/or the shape, of the conformable envelope.

The invention has been described above with the aid of embodiments without limitation of the general inventive concept as defined in the claims.

Many modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method, implemented by a processor device and a memory in communication therewith, for determining a lens blank for manufacturing a finished optical article, the method comprises:

determining virtual volume data based at least on finished optical article data representative of a volume of the finished optical article and over-thickness data representative of over-thickness requirements, the virtual volume data being determined so that the virtual volume defined by the virtual volume data includes the volume of the finished optical article and the over-thickness requirements;

generating information indicative of an orientation of the virtual volume based on at least one of i) manufacturing data relating to a manufacturing process to be used for at least part of a manufacturing of the finished optical article, and ii) the finished optical article data;

determining a lens blank based on said virtual volume data and on said information indicative of the orientation of said virtual volume so as to include the virtual volume defined by the virtual volume data; and generating and storing, in the memory, lens blank data corresponding to said determined lens blank for manufacturing said finished optical article from a lens blank having properties consistent with the lens blank data.

2. The method according to claim 1, wherein the over-thickness data are determined based on said manufacturing data relating to the manufacturing process to be used for at least part of the manufacturing of the finished optical article.

3. The method according to claim 1, wherein during the determining of the lens blank, the lens blank is determined by selecting the most suitable lens blank among a list of lens blanks.

4. The method according to claim 1,
wherein the virtual volume comprises a first surface, a second surface opposed to the first surface, and a first peripheral edge surface linking the first surface to the second surface,
wherein the finished optical article comprises a third surface, a fourth surface opposed to the third surface, and a second peripheral edge surface linking the third surface to the fourth surface, and
wherein the over-thickness data comprises a machining over-thickness value corresponding to the minimum distance between each point of a first set of surfaces consisting in the first and second surfaces of the virtual volume and each point of a second set of surfaces consisting in the third and the fourth surfaces of the finished optical article.

5. The method according to claim 4, wherein the machining over-thickness value is greater than or equal to 0.5 mm.

6. The method according to claim 1, wherein
wherein the virtual volume comprises a first surface, a second surface opposed to the first surface, and a first peripheral edge surface linking the first surface to the second surface,
wherein the finished optical article comprises a third surface, a fourth surface opposed to the third surface, and a second peripheral edge surface linking the third surface to the fourth surface,
wherein a first of the third surface and the fourth surface is manufactured prior to the second of the third surface and the fourth surface, and
wherein the over-thickness data comprises a rigidity over-thickness value corresponding to the minimum distance between each point of the first of the third and fourth surfaces of the finished optical article to be manufactured and the surface of the virtual volume directly opposite to the second of the third and fourth surfaces of the finished optical article to be manufactured.

7. The method according to claim 6, wherein the rigidity over-thickness value is greater than or equal to 4 mm.

8. The method according to claim 1,
wherein the virtual volume comprises a first surface, a second surface opposed to the first surface, and a first peripheral edge surface linking the first surface to the second surface,
wherein the finished optical article comprises a third surface, a fourth surface opposed to the third surface, and a second peripheral edge surface linking the third surface to the fourth surface, and
wherein the over-thickness data comprises a outline over-thickness value corresponding to the minimum distance between an inscribed circle of the first peripheral edge surface of the virtual volume and a circumscribed circle of the second peripheral edge surface of the finished optical article.

9. The method according to claim 8, wherein the outline over-thickness value is greater than or equal to 2 mm.

10. A method for manufacturing a finished optical article, comprising:
providing lens blank data for determining a lens blank in accordance with claim 1, and
manufacturing the finished optical article from the lens blank data.

11. The method according to claim 10, further comprising:
providing the lens blank determined from said lens blank data, including cutting a block of optical material so as to obtain the determined lens blank.

12. The method according to claim 10, further comprising:
forming the lens blank determined from said lens blank data, including conforming a conformable envelope comprising an optical material so as to obtain the determined lens blank.

13. The method according to claim 12, wherein the optical material is one selected from the group consisting of: a polymerizable composition, and a thermo-plastic material.

14. The method according to claim 1, wherein the information indicative of the orientation of the virtual volume is generated based on the manufacturing data.

15. The method according to claim 1, wherein the information indicative of the orientation of the virtual volume is generated based on the finished optical article data.

16. A device for determining a lens blank for manufacturing a finished optical article, the device comprising:
a processor device and a memory in communication therewith, the processor device and the memory configured to, in operation, carry out steps of:
determining virtual volume data based at least on finished optical article data representative of the volume of the finished optical article and over-thickness data representative of over-thickness requirements, the virtual volume data being determined so that the virtual volume defined by the virtual volume data includes the volume of the finished optical article and the over-thickness requirements;
generating information indicative of an orientation of the virtual volume based on at least one of i) manufacturing data relating to a manufacturing process to be used for at least part of a manufacturing of the finished optical article, and ii) the finished optical article data;
determining a lens blank based on said virtual volume data and on said information indicative of the orientation of said virtual volume so as to include the virtual volume defined by the virtual volume data; and
generating and storing lens blank data corresponding to said determined lens blank for manufacturing said finished optical article from a lens blank having properties consistent with the lens blank data.

17. An optical article supply system for providing an optical article, said system comprising a device for determining a lens blank according to claim 16, and machine tools configured for manufacturing the optical article from a lens blank suitable with said determined lens blank.

18. The method according to claim 16, wherein the information indicative of the orientation of the virtual volume is generated based on the manufacturing data.

19. The method according to claim 16, wherein the information indicative of the orientation of the virtual volume is generated based on the finished optical article data.

20. A non-transitory computer-readable storage medium having recorded thereon sequences of instructions that, upon execution by a processor device of the computer, cause the computer to carry out the method of claim 1.

* * * * *